United States Patent [19]

Hughes et al.

[11] 3,963,853

[45] June 15, 1976

[54] PRESSURE SENSITIVE TRANSFER SHEET

[75] Inventors: Nigel Hughes; Andrew Hunter Morris Renfrew, both of Manchester, England

[73] Assignee: Wiggins Teape Limited, London, England

[22] Filed: Dec. 27, 1972

[21] Appl. No.: 318,774

[30] Foreign Application Priority Data

Dec. 30, 1971 United Kingdom............... 60730/71

[52] U.S. Cl................................ 428/326; 260/335; 282/27.5; 428/487; 428/488
[51] Int. Cl.²....................... B41C 1/06; B41M 5/16
[58] Field of Search.......................... 117/36.2, 36.8; 260/335; 428/307, 323, 326, 487, 488; 282/27.5

[56] References Cited

UNITED STATES PATENTS

| | | | |
|---|---|---|---|
| 3,427,180 | 2/1969 | Phillips | 117/36.8 X |
| 3,432,327 | 3/1969 | Kan et al. | 117/36.2 |
| 3,637,757 | 1/1972 | Chao-Han Lin | 260/335 |
| 3,641,011 | 2/1972 | Lin et al. | 260/335 X |
| 3,764,369 | 10/1973 | Hoover et al. | 117/36.2 |

*Primary Examiner*—Thomas J. Herbert, Jr.
*Attorney, Agent, or Firm*—Burns, Doane, Swecker & Mathis

[57] ABSTRACT

A coated transfer sheet for pressure-sensitive copying systems which comprises an organic colorless color former containing two or more potential chromophoric systems each of which is capable of being activated substantially immediately when the compound is brought into contact with one or more activating substances.

26 Claims, No Drawings

PRESSURE SENSITIVE TRANSFER SHEET

This invention relates to colour formers and more particularly to colourless colour formers suitable for use in pressure-sensitive copying systems.

In pressure-sensitive copying systems it is already known to use a transfer sheet having on one surface a coating which is transferable to a copy sheet by the act of pressing the transfer sheet against the copy sheet, for example by writing or typing on the other surface of the transfer sheet, and which coating contains a colourless colour former which is capable of substantially immediate colour development when brought into contact with an activating substance provided as a coating on the copy sheet. The colour formers that have been proposed are dyestuff precursors or derivatives which contain a potential chromophoric system capable of being activated when the colour former is brought into contact with the activating substance.

As example of such a colour former is Crystal Violet Lactone which contains the elements of a triphenylmethane chromophoric system. When Crystal Violet Lactone is brought into contact with an acidic substance a blue dyestuff of the triphenylmethane series is formed. In addition to Crystal Violet Lactone, other colour formers are known which give a blue image when used in a copying process. When it is desired to produce a darker image, particularly black or blue-black, it is necessary to use a mixture of colour formers and this is not always convenient.

The present invention provides a colourless colour former comprising an organic compound containing two or more potential chromophoric systems each of which is capable of being activated substantially immediately when the compound is brought into contact with one or more activating substances.

Particularly useful colour formers of the invention are those in which the two or more potential chromophoric systems when activated provide mutually different colour effects thus making possible the production from some combinations of dark images.

Many combinations of potential chromophoric systems may be used. In some compounds the chromophoric systems are present in leuco form. Particularly useful compounds are those which when activated produce a diarylmethane chromophore and a xanthene chromophore.

Suitable colour formers are compounds of the formula:

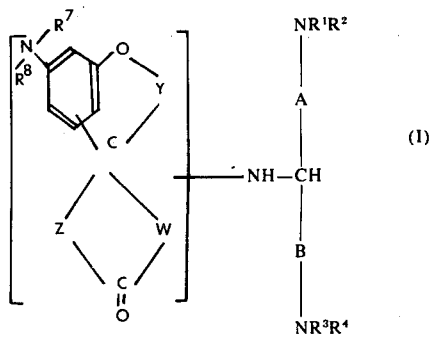

(I)

wherein Y represents an optionally substituted arylene radical and Z represents an optionally substituted 1,2-phenylene radical; W represents oxygen or a group of the formula —$NR^6$— in which $R^6$ denotes hydrogen or an optionally substituted alkyl or aryl radical; A and B each independently represents a 1,4-phenylene residue; each of $R^1 R^2 R^3$ and $R^4$ independently represents an optionally substituted alkyl, aralkyl or cycloalkyl radical or forms part of a divalent organic chain which together with the attached nitrogen atom constitutes a heterocyclic ring; each of $R^6$ and $R^8$ independently represents an optionally substituted alkyl radical; and the —NH— group is attached to one of the radicals Y, Z or W.

Aryl radicals which may be represented by Y include phenyl and naphthyl.

As examples of optionally substituted alkyl radicals which may be represented by $R^1$, $R^2$, $R^3$, $R^4$, $R^6$, $R^7$ and $R^8$ there may be mentioned optionally substituted lower alkyl radicals, for example ethyl, propyl, butyl, β-hydroxyethyl, β-chloroethyl, and particularly, methyl.

As examples of optionally substituted aralkyl radicals which may be represented by $R^1$, $R^2$, $R^3$ and $R^4$ there may be mentioned 4-methoxybenzyl, 2-methylbenzyl and, particularly, benzyl.

As examples of optionally substituted cycloalkyl radicals which may be represented by $R^1$, $R^2$, $R^3$ and $R^4$ there may be mentioned 2-methylcyclohexyl, 4-methylcyclohexyl, cyclopentyl and, particularly, cyclohexyl.

As examples of optionally substituted aryl radicals which may be represented by $R^6$ there may be mentioned 2-methylpenyl, 4-methylphenyl, 4-nitrophenyl, 3-chlorophenyl, naphth-2-yl and, particularly, phenyl.

As examples of heterocyclic rings which may be formed by $R^1$ and $R^2$ or $R^3$ and $R^4$ being joined together there may be mentioned 5- or 6-membered rings such as piperidine, N-methylpiperazine and hydrolidine rings.

Preferably $R^1$, $R^2$, $R^3$ and $R^4$ are optionally substituted alkyl radicals, particularly unsubstituted alkyl radicals such as methyl or ethyl, or in appropriate pairs, for example $R^1$ and $R^2$ together, they form divalent organic chains, preferably hydrocarbon chains.

The colour formers of Formula I may be prepared by reacting a compound having the general formula:

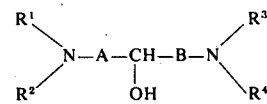

wherein A, B, $R^1$, $R^2$, $R^3$ and $R^4$ have the meaning already stated, with a compound of the formula:

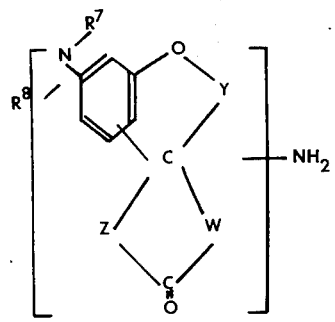

wherein Y, Z, W, $R^7$ and $R^8$ have the meanings already stated, the —$NH_2$ group being attached to Y, or Z or W.

The colour formers of the invention are useful in the production of transfer sheets for use in pressure-sensitive copying systems of the type described above.

The transfer sheets may be prepared by applying to one surface of a suitable support material a coating composition containing one or more of the colour formers of the invention.

Suitable support materials include paper, glassine, plastics material films and the like depending upon the use to which the transfer sheet is to be put. Suitable plastics films include polypropylene film and especially polyester film such as polyethylene terephthalate film.

The coatings may be such that the colour former or colour formers are evenly dispersed throughout or they may be of the form in which the coating comprises a continuous phase and a discontinuous phase wherein the discontinuous phase comprises a plurality of discrete globules or microcapsules containing the colour former or colour formers in solution form.

In addition to the colour former or colour formers the coating compositions may contain conventional ingredients, for example material to prevent accidental rupture of the globules or microcapsules, and may be prepared in conventional manner.

The nature of the activating substance or substances present on the copy sheet and capable of reacting with the colour former or colour formers to form a colour depends upon the composition of the colour former.

When the transferable coating contains a colour former of Formula I, the activating substance present in the non-transferable coating is suitably an electron-accepting substance, for example a so-called acid mineral such as attapulgite, kaolin, pyrophyllite, talc, bentonite, halloysite, calcium sulphate, calcium citrate, magnesium trisilicate, calcium phosphate or barium sulphate, or an acidic resin such as a phenolic resin. Alternatively, there may be used a coating of an acid treated substance such as that obtained with coating compositions containing acids such as tannic, oleic, gallic, lauric, phosphotungstic and phosphomolybdic acids.

The invention is illustrated but not limited by the following Examples in which all parts are by weight.

EXAMPLE 1

A solution of 2.7 parts of 4,4'-bis (dimethylamino) benzhydrol (Michler's Hydrol) and 3.86 parts of 3-diethylamino-7-amino fluoran in 25 parts of ethyl alcohol was heated under reflux and stirred for 3 hours. The solution was then cooled whereupon a colourless crystalline solid separated. The solid was collected by filtration, washed with ethyl alcohol and then with diethyl ether and dried. 5.5 parts of product having the structure

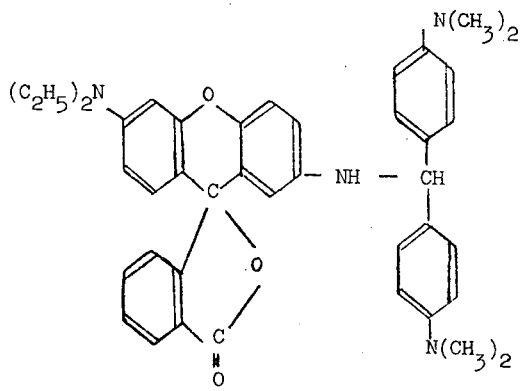

were thus obtained.

When a solution of the above colour former, dissolved in a suitable organic solvent, is brought into contact with an 'acid surface' such as are used as copy sheet receptor surfaces in pressure sensitive copying systems as described above, a blue-black image is formed which combines the effect of the fluoran chromophore (red) and the diphenylmethane chromophore (blue).

EXAMPLE 2

A suspension of 2.7 parts of Michler's Hydrol and 5.24 parts of 3-diethylamino-7-amino-3', 4', 5', 6'-tetrachlorofluoran in 50 parts of toluene was heated under reflux and stirred for 2 hours. The solution was cooled and the solid which separated was isolated by filtration and dried. 7.2 parts of product having the structure:

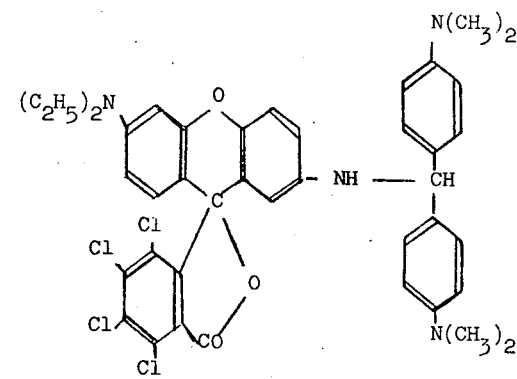

were thus obtained. when dissolved in a suitable organic solvent and brought into contact with an electron accepting surface a blue-black image is formed.

EXAMPLE 3

To 100 parts of acetone were added 3.22 parts of 4,4'-bis-pyrrolidinyl benzhydrol and 4.44 parts of 3-diethylamino-5,6-benzo-7-amino fluoran. The suspension was heated under reflux for 4 hours then cooled. The solid which separated was collected and air dried to give 4.8 parts of the desired product having the structure:

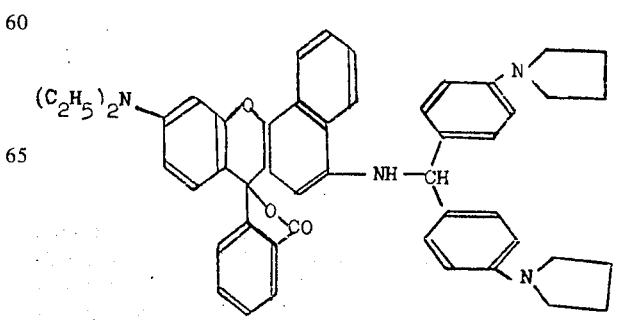

Contact with an electron accepting surface gives an almost black image.

EXAMPLE 4

To 100 parts of toluene were added 3.28 parts of 4,4'bis-(diethyl-amino)benzhydrol and 5.46 parts of 3-(di-β-chloroethylamino)-7-anilino-4'-aminofluoran and the mixture heated under reflux for 2 hours. The solvent was reduced to half volume by distillation and on cooling the product separated from solution. Isolation and drying gave 5.4 parts of grey solid.

Contact with an electron accepting surface gives a blue-black image.

EXAMPLE 5

39.9 parts of 3-diethylamino-6,8-dimethylfluoran, 13.8 parts of p-nitroaniline, 1000 parts of dioxan and 20 parts of phorphorous oxychloride were heated under reflux for 5 hours. The mixture was cooled, 1000 parts of N sodium hydroxide added and the solid which resulted isolated by filtration and washed well with water.

The solid was slurried in ethanol and hydrogenated at room temperature and atmospheric pressure over palladised charcoal to give 21.2 parts of the desired aminolactam.

5.2 parts of the above aminolactam, 2.7 parts of Michler's Hydrol and 50 parts of ethanol were heated under reflux for 2 hours then cooled. The solid which separated was collected and dried to give 3.1 parts of the desired product having the structure:

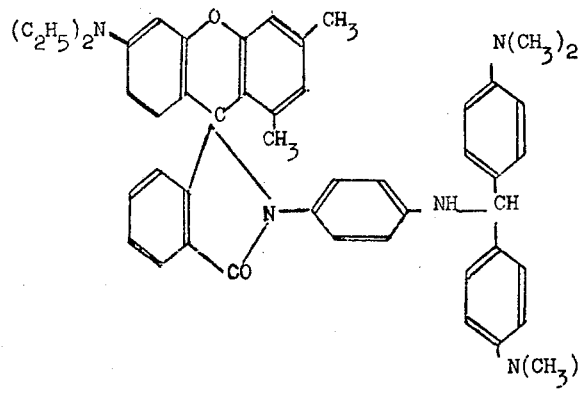

Contact with electron accepting surfaces gives a black image.

The following further Examples of the invention were made in an analogous manner to those described above.

| No. | R₁ & R₃ | R₂ & R₄ | Y | Z-subst. | W | R₇ & R₈ |
|-----|---------|---------|---|----------|---|---------|
| 6 | methyl | methyl | 4-bis(4-N,N-dimethylaminophenyl)-methylamino-6-carboxyethylphen-1,2-ylene | — | oxygen | ethyl |
| 7 | '' | '' | 1,2-Naphthylene | — | p-bis[p(CH₃)₂NC₆H₄]CHNHC₆H₄N= | '' |
| 8 | benzyl | '' | 4-bis(4-N,N-dimethylaminophenyl)-methylaminophen-1,2-ylene | — | oxygen | '' |
| 9 | cyclohexyl | '' | '' | — | '' | '' |
| 10 | methyl | '' | '' | 4'-chloro | '' | '' |
| 11 | methyl | '' | 4-Chloronaphth-1,2-ylene | — | p-NHC₆H₄N= | '' |
| 12 | '' | '' | 4-bis(4-N,N-dimethylaminophenyl)-methylaminophen-1,2-ylene | — | C₆H₅N= | '' |
| 13 | '' | '' | '' | — | p-CH₃C₆H₄N= | '' |
| 14 | '' | '' | '' | — | HN= | '' |
| 15 | '' | '' | 4-bis(4-N,N-dimethylaminophenyl)-methylamino-5-methylphen-1,2-ylene | — | C₂H₅N= | '' |

What we claim is:

1. A transfer sheet, for use in a pressure-sensitive copying system, comprising a support material having on one surface thereof a coating composition containing at least one colourless colour former, wherein said colourless colour former comprises a single organic compound having the structural formula:

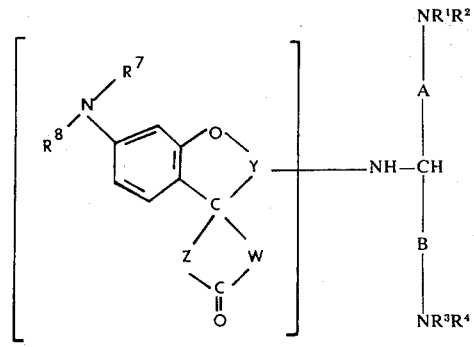

wherein Y represents a phenylene or naphthylene or substituted phenylene or naphthylene radical, Z represents a 1,2-phenylene or substituted 1,2-phenylene radical, W represents oxygen or a group of the formula -NR⁶- wherein R⁶ is selected from the group consisting of hydrogen, lower alkyl, aryl, substituted lower alkyl, and substituted aryl radicals, A and B each independently represents a 1,4-phenylene residue, R¹, R², R³ and R⁴, each is selected from the group consisting of lower alkyl, substituted lower alkyl, aralkyl, substituted aralkyl, cycloalkyl and substituted cycloalkyl radical or forms part of a divalent organic chain which together with the attached nitrogen atom constitutes a heterocyclic ring, R⁷ and R⁸ each independently represents a lower alkyl or substituted lower alkyl radical, and the -NH- group is either attached to Y or is attached as one substituent or the sole substituent of $R^6$ when said $R^6$ is a substituted aryl radical, said organic compound thus containing within the same molecule at least two potential chromophoric systems, each of said potential chromophoric systems being capable of being activated substantially immediately when the compound is brought into contact with one or more acidic activating substances.

2. The transfer sheet of claim 1, wherein each of $R^1$, $R^2$, $R^3$, $R^4$, $R^6$, $R^7$ and $R^8$ is selected from the group consisting of ethyl, propyl, butyl, β-hydroxyethyl, and β-chloroethyl.

3. The transfer sheet of claim 1, wherein $R^1$, $R^2$, $R^3$, $R^4$, $R^6$, $R^7$ and $R^8$ are each methyl.

4. The transfer sheet of claim 1, wherein each of $R^1$, $R^2$, $R^3$ and $R^4$ is selected from the group consisting of 4-methoxybenzyl and 2-methylbenzyl.

5. The transfer sheet of claim 1, wherein $R^1$, $R^2$, $R^3$ and $R^4$ are each benzyl.

6. The transfer sheet of claim 1, wherein each of $R^1$, $R^2$, $R^3$ and $R^4$ is selected from the group consisting of 2-methylcyclohexyl, 4-methyl-cyclohexyl and cyclopentyl.

7. The transfer sheet of claim 1, wherein $R^1$, $R^2$, $R^3$ and $R^4$ each represent cyclohexyl.

8. The transfer sheet of claim 1, wherein $R^6$ is selected from the group consisting of 2-methylphenyl, 4-methylphenyl, 4-nitrophenyl, 3-chlorophenyl and naphth-2-yl.

9. The transfer sheet of claim 1, wherein $R^6$ represents phenyl.

10. The transfer sheet of claim 1, wherein $R^1$ and $R^2$, or $R^3$ and $R^4$ are joined together to form a member selected from the group consisting of a piperidine, a N-methylpiperazine and a pyrrolidine heterocyclic ring.

11. The transfer sheet of claim 1, wherein each of either $R^1$ and $R^2$ or $R^3$ and $R^4$ form hydrocarbon chains.

12. The transfer sheet of claim 1, wherein said organic compound is 3-(N,N-diethylamino)-7-[bis(4-N,N-dimethylaminophenyl)methyl-amino]-fluoran.

13. The transfer sheet of claim 1, wherein said organic compound is 3′, 4′, 5′, 6′-tetrachloro-3-(N,N-dimethylamino)-7-[bis(4-N,N-dimethylaminophenyl)-methylamino] fluoran.

14. The transfer sheet of claim 1, wherein said organic compound is 3-(N,N-diethylamino)-5,6-benzo-7-[bis(4-pyrrolidin-1-ylphenyl)methyl-amino] fluoran.

15. The transfer sheet of claim 1, wherein said organic compound is 4′-amino-3-(N,N-di-2-chloroethylamino)-7-[bis(4-N,N-diethylaminophenyl)methylamino] fluoran.

16. The transfer sheet of claim 1, wherein said organic compound is 3-(N,N-diethylamino)-6,8-dimethylxanthene-9-spiro-3′-{2′-[4-bis 4-N,N-dimethylaminophenyl} methylamino)phenyl]} phthalimidine.

17. The transfer sheet of claim 1, wherein said organic compound is 5-carboxyethyl-3-(N,N-diethylamino-7-[bis(4-N,N-dimethylaminophenyl) methylamino] fluoran.

18. The transfer sheet of claim 1, wherein said organic compound is 3-(N,N-diethylamino)benzo xanthene-9-spiro-3′-{2′-[4-(bis{4-N,N-dimethylaminophenyl}methylamino)phenyl]}phthalimidine.

19. The transfer sheet of claim 1, wherein said organic compound is 3-(N,N-diethylamino)-7-[bis(4-N-benzyl-N-methylaminophenyl) methylamino]fluoran.

20. The transfer sheet of claim 1, wherein said organic compound is 3-(N,N-diethylamino)-7-[bis(4-N-cyclohexyl-N-methylaminophenyl) methylamino] fluoran.

21. The transfer sheet of claim 1, wherein said organic compound is 4′-chloro-3-(N,N-diethylamino)-7-[bis(4-N,N-dimethylaminophenyl) methylamino] fluoran.

22. The transfer sheet of claim 1, wherein said organic compound is 7-chloro-3-(N,N-diethylamino)-benzo xanthene-9-spiro-3′-{2′- 4-(bis-{4-N,N-dimethylaminophenyl}methylamino)phenyl}phthalimidine.

23. The transfer sheet of claim 1, wherein said organic compound is 3-(N,N-diethylamino)-7-[bis(4-N,N -dimethylaminophenyl)methylamino]-xanthene-9-spiro-3′-(2′-phenyl) phthalimidine.

24. The transfer sheet of claim 1, wherein said organic compound is 3-(N,N-diethylamino)-7-[bis(4-N,N-dimethylaminophenyl)methylamino]xanthene-9-spiro-3′-[2′-(4-methylphenyl)]phthalimidine.

25. The transfer sheet of claim 1, wherein said organic compound is 3-(N,N-diethylamino)-7-[bis(4-N,N-dimethylaminophenyl)methylamino]xanthene-9-spiro- 3′-phthalimidine.

26. The transfer sheet of claim 1, wherein said organic compound is 3-(N,N-diethylamino)-6-methyl-7-[bis(4-N,N-dimethylaminophenyl)methylamino]xanthene-9-spiro-3′-(2′-ethyl)phthalimidine.

* * * * *